United States Patent
Heo et al.

(10) Patent No.: US 10,442,039 B2
(45) Date of Patent: Oct. 15, 2019

(54) METHOD FOR PRODUCING MEMBRANE WALL, PIPE BENDING DEVICE FOR MANUFACTURING TRANSFER DUCT AND METHOD FOR MANUFACTURING TRANSFER DUCT USING SAME

(71) Applicant: DOOSAN HEAVY INDUSTRIES & CONSTRUCTION CO., LTD., Changwon-si (KR)

(72) Inventors: Won Heo, Daejeon (KR); Young Jin Ju, Daegu (KR); Sung Ku Park, Daejeon (KR); Min Su Paek, Daejeon (KR); Sung Guck Lee, Changwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 1025 days.

(21) Appl. No.: 14/773,109

(22) PCT Filed: Dec. 4, 2013

(86) PCT No.: PCT/KR2013/011136
§ 371 (c)(1),
(2) Date: Sep. 4, 2015

(87) PCT Pub. No.: WO2014/137059
PCT Pub. Date: Sep. 12, 2014

(65) Prior Publication Data
US 2016/0175999 A1    Jun. 23, 2016

(30) Foreign Application Priority Data
Mar. 7, 2013 (KR) .......... 10-2013-0024240

(51) Int. Cl.
*C10J 3/74* (2006.01)
*B23P 15/00* (2006.01)
(Continued)

(52) U.S. Cl.
CPC .............. *B23P 15/00* (2013.01); *B21D 7/08* (2013.01); *B23K 9/0052* (2013.01); *B23K 9/167* (2013.01);
(Continued)

(58) Field of Classification Search
CPC ...... B23K 31/00; B23K 9/0052; B23K 9/167; B23K 10/02; B23K 37/0443;
(Continued)

(56) References Cited

U.S. PATENT DOCUMENTS 2,013,630 A * 9/1935 Goldsborough ..... B23K 9/0286
219/60 A
3,221,135 A * 11/1965 Maier, Jr. ............. B23K 9/0052
219/137 R
(Continued)

FOREIGN PATENT DOCUMENTS

JP    05-157225 A    6/1993
JP    10-128160 A    5/1998
(Continued)

OTHER PUBLICATIONS

International Search Report of PCT/KR2013/011136 dated Mar. 31, 2014 [PCT/ISA/210].

*Primary Examiner* — Bayan Salone
(74) *Attorney, Agent, or Firm* — INVENSTONE Patent, LLC

(57) ABSTRACT

Disclosed is a method for producing a cylindrical membrane wall including a plurality of tubes having a coolant passing through an inner part thereof. The method includes producing a plurality of sub-bundles by welding a plurality of tubes (Continued)

to each other after longitudinally arranging the tubes to be adjacent to each other in parallel, producing a plurality of panel-type bundles by welding the sub-bundles to each other, forming a plurality of curved bundles having a curved surface of a predetermined curvature by pressing the panel-type bundles, and welding the curved bundles to each other using a jig.

7 Claims, 18 Drawing Sheets

(51) Int. Cl.
  *B23P 15/26* (2006.01)
  *B23K 9/00* (2006.01)
  *B23K 9/16* (2006.01)
  *B23K 10/02* (2006.01)
  *B23K 37/04* (2006.01)
  *B23K 31/00* (2006.01)
  *B21D 7/08* (2006.01)
  *B23K 9/167* (2006.01)
  *B23K 101/06* (2006.01)

(52) U.S. Cl.
  CPC .............. *B23K 10/02* (2013.01); *B23K 31/00* (2013.01); *B23K 37/0443* (2013.01); *B23P 15/26* (2013.01); *C10J 3/74* (2013.01); *B23K 2101/06* (2018.08); *F28F 2255/00* (2013.01); *Y02E 20/16* (2013.01); *Y02E 20/18* (2013.01); *Y10T 29/4935* (2015.01); *Y10T 29/49353* (2015.01)

(58) Field of Classification Search
  CPC ....... B23K 2201/06; B21D 7/08; B23P 15/00; B23P 15/26; C10J 3/74; F28F 2255/00; Y02E 20/16; Y02E 20/18; Y10T 29/4935; Y10T 29/49353

See application file for complete search history.

(56) References Cited

U.S. PATENT DOCUMENTS

| | | | | |
|---|---|---|---|---|
| 3,252,511 | A * | 5/1966 | Gerber | B23K 9/0052 165/172 |
| 4,179,059 | A * | 12/1979 | Chang | B23K 9/0286 219/105 |
| 4,653,301 | A * | 3/1987 | Meliga | B21D 7/08 72/170 |
| 7,740,671 | B2 * | 6/2010 | Yows | C10J 3/485 48/119 |
| 2008/0141913 | A1 * | 6/2008 | Yows | C10J 3/485 110/336 |
| 2010/0031506 | A1 * | 2/2010 | Hartwig | B23K 9/0052 29/890.046 |
| 2010/0281937 | A1 * | 11/2010 | Caporusso | B21D 7/08 72/8.3 |
| 2011/0005291 | A1 * | 1/2011 | Cymbalisty | B01F 5/0646 72/250 |
| 2012/0009435 | A1 * | 1/2012 | Nakamura | B21D 7/08 428/603 |

FOREIGN PATENT DOCUMENTS

| | | |
|---|---|---|
| JP | 2008-169390 A | 7/2008 |
| KR | 20-1998-0061894 U | 11/1998 |
| KR | 10-2007-0011298 A | 1/2007 |
| KR | 10-2010-0087326 A | 8/2010 |
| KR | 10-1073648 B1 | 10/2011 |
| WO | 2008/110592 A1 | 9/2008 |

* cited by examiner

METHOD FOR PRODUCING MEMBRANE WALL, PIPE BENDING DEVICE FOR MANUFACTURING TRANSFER DUCT AND METHOD FOR MANUFACTURING TRANSFER DUCT USING SAME

CROSS REFERENCE TO RELATED APPLICATIONS

This application is a National Stage of International Application No. PCT/KR2013/011136, filed Dec. 4, 2013, claiming priority based on Korean Patent Application No. 10-2013-0024240, filed Mar. 7, 2013, the contents of all of which are incorporated herein by reference in their entirety.

TECHNICAL FIELD

The present invention relates to a method for producing a cylindrical membrane wall including a plurality of tubes through which water flows, a pipe bending device for manufacturing a transfer duct having a curved central portion, and a method for manufacturing the transfer duct using the same.

BACKGROUND ART

In general, an integrated gasification combined cycle (IGCC) power plant may efficiently generate cleaner energy from a hydrocarbon feedstock such as coal.

According to an IGCC technology, the hydrocarbon feedstock may react with oxygen in a gasifier to change into a gas mixture, that is, syngas.

The gasifier includes an external pressure vessel and an internal membrane wall having a cylinder shape and provided in the external pressure vessel to surround a gasification reaction area.

The membrane wall, which protects the external pressure vessel from a high reaction temperature, is produced using a series of tubes like a water-cooled wall of a boiler furnace.

Coals and oxygen are introduced into the gasification area of the gasifier to form the syngas including hydrogen and carbon monoxide.

A mineral material contained in coals forms liquid slag that flows down into a water receiving part provided on the bottom of the gasifier along a hot internal surface of a transfer duct.

The syngas cooled in the gasifier as described above is introduced into a syngas cooler and cooled to a low temperature to generate high pressure and middle pressure steams.

The syngas cooler may include a long external vessel to receive the syngas into the syngas cooler, and a cylindrical membrane wall may be employed in the external vessel to circulate, for example a coolant.

Meanwhile, a communication part may be interposed between the gasifier and the cooler so that the gasifier communicates with the cooler. The communication part may include a membrane wall (transfer duct) produced in the shape of a cylindrical duct formed by coupling a plurality of tubes having a coolant flowing therein to each other and provided at the intermediate portion thereof with a curved part, similarly to the membrane wall employed in the gasifier and the cooler.

Hereinafter, a procedure of producing the membrane wall having the shape of the cylindrical duct according to the related art will be described.

FIG. 1 is a view to explain the state that the cylindrical membrane wall according to the related art is produced.

Referring to FIG. 1, a plurality of unit sub-bundles 1 are produced by welding a plurality of tubes 1a to each other. In this case, three tubes 1a or less are employed in the unit sub-bundle 10 to have a curvature corresponding to that of the cylindrical membrane wall.

FIG. 2 is a view showing the state that a turn buckle is employed when producing the membrane wall according to the related art, and FIG. 3 is a view showing the state that a jig is employed when producing the membrane wall according to the related art.

Referring to FIGS. 2 and 3, a plurality of sub-bundles 1 produced by welding three tubes 1a to each other are fixed to a cylindrical jig 5 by a turn buckle 7.

Thereafter, a worker manually carries out a welding work to couple the unit sub-bundles 1 to each other. After the welding work has been finished, the worker removes the turn buckle 7 and the jig 5 to complete the cylindrical membrane wall.

As described above, according to the related art, after disposing the unit sub-bundles 1 in the cylindrical jig 5, the sub-bundles 1 are manually welded to each other so that the cylindrical membrane wall having a curved surface is produced.

Accordingly, there is a difficulty in producing the sub-bundle 1 by coupling at least three tubes 1a to each other in order to form a desirable curved surface. Therefore, the number of processes to produce the sub-bundles 1 may be increased, and the number of works to couple the sub-bundles 1 may be increased.

In addition, as each sub-bundle 1 is fixed to the cylindrical jig 5 by the turn buckle 5, the work to fix the turn buckle 5 is frequently performed, and the usage of the turn buckle 5 is increased.

In addition, as the sub-bundles are manually coupled to each other by the worker, the coupling errors may occur, and deformation and residual stress may occur in the welding work.

Meanwhile, the transfer duct interposed between the gasifier and the syngas cooler and manufactured in the shape of a cylinder having a curved part is manufactured through the following processes.

First, after primarily bending a unit pipe assembly, which is configured by coupling a pair of pipes to each other through a pin, with a predetermined curvature radius, the bent unit pipe assembly is secondarily tilted, so that a bending product tilted with the predetermined curvature radius may be formed.

Next, bent unit pipe assemblies are welded to each other in a longitudinal direction to manufacture the transfer duct in the shape of a cylinder having a curved part.

In order to form the transfer duct according to the related art, which is the bending product, as described above, after primarily bending the unit pipe assembly with a predetermined curvature radius, the unit pipe assembly, which is primarily bent, is secondarily pressed, so that the unit pipe assembly may be tilted.

That is to say, in the primary bending process, a pair of pipes constituting the unit pipe assembly are maintained in a horizontal state, and bent with a predetermined curvature radius using a bending die having a pin-shaped groove. In the secondary bending process, the bending product bent with the predetermined curvature radius is twisted using a bending tool having a flat roller shape.

As described above, the bent unit pipe assemblies are coupled to each other to manufacture the transfer duct having the curved central part.

As described above, according to the transfer duct of the related art, as two processes are employed in the procedure of bending the unit pipe assembly, the number of processes may be increased.

In addition, the dimension of the final product may be changed as the pipes are secondarily tilted while the shapes of the primarily bent pipes are maintained. If the dimension of the final product is changed, it is necessary to correct the bending product by applying additional physical force to the bending product (for example, a hydraulic jack).

DISCLOSURE

Technical Problem

An object of the present invention is to provide a method for producing a membrane wall, capable of reducing the time to produce the membrane wall having a cylindrical shape and the production cost of the membrane wall by producing a curved panel including sub-bundles and having a predetermined curvature.

Another object of the present invention is to provide a method for producing a membrane wall, capable of reducing a welding amount, production errors, and the deformation in welding by coupling sub-bundles to each other through automatic welding.

Still another object of the present invention is to provide a pipe bending device for manufacturing a transfer duct, capable of simultaneously performing works of bending a unit pipe assembly with a predetermined curvature radius and of tilting the unit pipe assembly with a predetermined slope by improving the structure of a bending die, and a method for manufacturing the transfer duct using the same.

Technical Solution

According to one embodiment of the present invention, there is provided a method for manufacturing a cylindrical membrane wall, which includes producing a plurality of sub-bundles by welding a plurality of tubes to each other after longitudinally arranging the tubes to be adjacent to each other in parallel, producing a plurality of panel-type bundles by welding the sub-bundles to each other, forming a plurality of curved bundles having a curved surface of a predetermined curvature by pressing the panel-type bundles, and welding the curved bundles to each other using a jig.

The panel-type bundles may be produced to be curved such that a longitudinal direction of the tubes is parallel to a longitudinal direction of the cylindrical membrane wall.

The sub-bundles may be produced by welding at least four tubes to each other, and may be coupled to each other through automatic welding.

The tubes constituting the sub-bundles may be coupled to each other in a membrane panel welding manner when the tubes include chrome steel, and the tubes constituting the sub-bundles may be coupled to each other in a plasma welding manner when the tubes include alloy steel.

The cylindrical membrane wall is manufactured using two to four panel-type bundles, and the sub-bundles constituting the panel-type bundle may be coupled to each other through automatic welding.

The sub-bundles may be coupled to each other in a Gantry panel welding manner when the tubes include chrome steel, and the sub-bundles may be coupled to each other in a Gas tungsten arc welding manner when the tubes include alloy steel.

According to another embodiment of the present invention, there is provided a pipe bending device for manufacturing a transfer duct provided at a central portion thereof with a curved part. The pipe bending device includes a movable bending tool that moves to a predetermined position during movement of a pipe to press the pipe such that the pipe has a predetermined curvature, and a counter tool fixedly disposed in opposition to the movable bending tool to support the pipe. The movable bending tool includes a bending inclination surface slidably making contact with a longitudinal surface of the pipe to machine the pipe at a predetermined angle of twist, and the counter tool includes a counter inclination surface corresponding to the bending inclination surface.

The movable bending tool may include at least one bending roller supported by a movable axis that is movable by a driving device.

The counter tool may include at least one die roller facing the bending roller and rotatably supported by a fixed axis that is fixed to a predetermined position.

The bending inclination surface may be downward or upward inclined at a predetermined angle with respect to the movable axis along an outer circumference of the bending roller, and the counter inclination surface may be inclined along an outer circumference of the die roller corresponding to a movable inclination surface.

The bending inclination surface and the counter inclination surface may be formed therein with grooves corresponding to an outer contour of the pipe.

The movable bending tool may include two bending rollers spaced apart from each other by a predetermined interval, the counter tool may include one die roller facing the two bending rollers and interposed between the two bending rollers, and the bending rollers may linearly move such that a distance between centers of the bending rollers is reduced.

The movable bending tool may include one bending roller having the movable axis disposed rotatably at a predetermined angle, and the counter tool may include a die roller fixedly disposed in opposition to the bending roller. The pipe bending device may further include a contact roller fixedly disposed at one side of the bending roller to support the pipe.

A plurality of movable bending tools having mutually different bending inclination surfaces and the counter tool having the counter inclination surface may be provided and configured to be variably employed depending on the angle of the twist required for the pipe.

The pipe may include a pair of pipes coupled to each other in a longitudinal direction thereof through a pin.

According to still another embodiment of the present invention, there is provided a method for manufacturing a transfer duct. The method includes forming a unit pipe assembly by coupling a pair of pipes to each other in a longitudinal direction through a pin, propelling the unit pipe assembly into a space between a movable bending tool and a counter tool, pressing the unit pipe assembly with a predetermined curvature by moving the movable bending tool to a predetermined position while brining a surface of the unit pipe assembly into contact with inclination surfaces of the movable bending tool and the counter tool to bend the unit pipe assembly at a predetermined angle of twist, and forming a cylindrical duct having a curved part by coupling unit pipe assembles, which are bent in the bending of the unit pipe assembly, to each other.

The movable bending tool may include at least one bending roller, which is rotatably supported by a movable axis movable to the predetermined position, and has an outer circumferential surface that is inclined upward or downward, the counter tool may include at least one die roller, which is rotatably supported by a fixed axis fixedly disposed at the predetermined position, and have an outer circumferential surface inclined with respect to the fixed axis corresponding to the outer circumferential surface of the bending roller, and the unit pipe assembly may be bent with the predetermined curvature and the predetermined angle of the twist by moving the bending roller to the predetermined position.

The outer circumferential surface of the bending roller may be inclined upward or downward with respect to the movable axis, and the die roller may be inclined corresponding to the outer circumferential surface of the bending roller.

Outer circumferential surfaces of the bending roller and the die roller may have grooves formed corresponding to an outer contour of the unit pipe assembly.

Various movable bending tools and various counter tools may be provided to have bending inclination surfaces and counter inclination surfaces having various inclination angles depending on the angle of the twist of the unit pipe assembly, and the bending roller and the die roller may be variably employed depending on the angle of twist of the unit pipe assembly.

The pipes may be coupled to each other through automatic welding to constitute the unit pipe assembly.

The automatic welding may be performed based on a plasma welding manner.

A high-temperature fluid may flow through an inner part of the cylindrical duct.

A coolant may through an inner part of the pipe to cool the high-temperature fluid.

Advantageous Effects

As described above, according to the method for producing the membrane wall of one embodiment of the present invention, a plurality of sub-bundles are automatically welded to each other, so that the welding amount and the welding errors can be reduced.

According to the method for producing the membrane wall of one embodiment of the present invention, at least four tubes are arranged to constitute the sub-bundle, so that the number of whole works of producing the membrane wall having the cylindrical shape can be reduced.

According to the method for producing the membrane wall of one embodiment of the present invention, the flat plane is formed by coupling the sub-bundles to each other, and then pressed to have the curved surface formed with the predetermined curvature, so that the number of works can be reduced and the use of the fixing jig can be simplified.

According to the method for manufacturing the transfer duct of one embodiment of the present invention, the works of bending the slender member (unit pipe assembly) with a desirable curvature and of tilting the slender member at a predetermined angle are simultaneously performed by one tool, so that the number of bending works can be reduced, and the reliability in the dimension of the bending product can be improved.

BEST MODE

Mode for Invention

Figure 4:
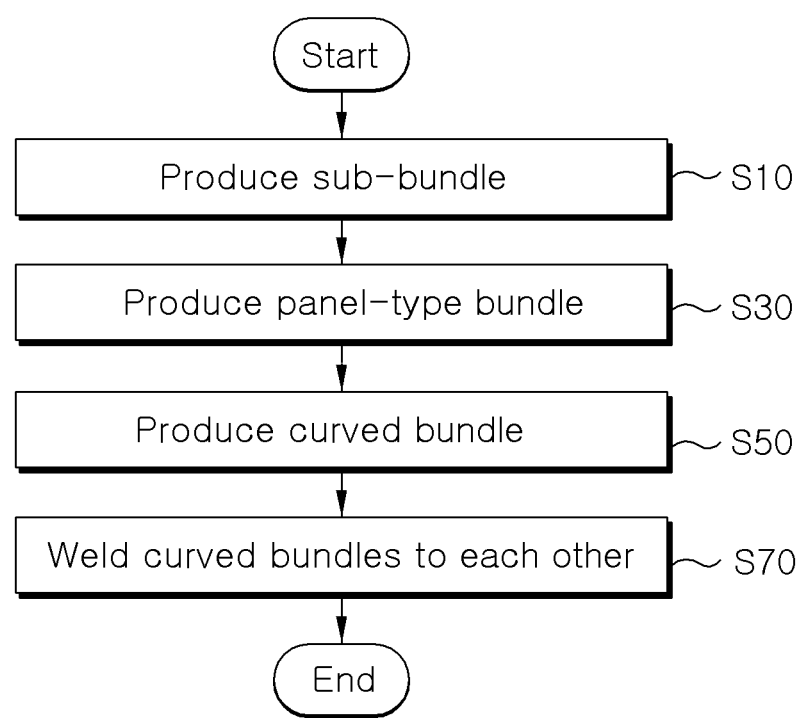
FIG. 4 is a flowchart showing the procedure of producing a cylindrical membrane wall according to one embodiment of the present invention.

FIG. 4 is a flowchart showing the procedure of producing a cylindrical membrane wall according to one embodiment of the present invention.

Referring to FIG. 4, a method for producing a cylindrical membrane wall includes producing a plurality of sub-bundles by welding a plurality of tubes to each other after longitudinally arranging the tubes on the same plane to be adjacent to each other in parallel (S10), producing a plurality of panel-type bundles by welding the sub-bundles to each other (S30), forming a plurality of curved bundles having a curved surface of a predetermined curvature by pressing the panel-type bundles (S50) and welding the curved bundles to each other using a jig (S70).

The cylindrical membrane wall is applicable to a gasifier, a syngas cooler, a quench pipe, and the like. In addition, the cylindrical membrane wall may be employed for industrial or heating boilers.

Figure 5:
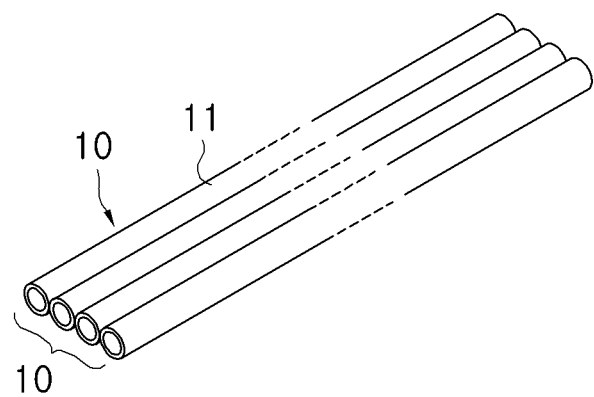
FIG. 5 is a view showing the state that a sub-bundle constituting the cylindrical membrane wall according to one embodiment of the present invention is produced.

FIG. 5 is a view showing the state that a sub-bundle constituting the cylindrical membrane wall according to one embodiment of the present invention is produced.

Referring to FIGS. 4 and 5, in step S10, a sub-bundle 10 is produced by welding at least four tubes 11 to each other. The tubes 11 are longitudinally arranged in parallel to each other on the same plane. The tubes 11 are coupled to each other through automatic welding.

Since at least four tubes 11 may be provided to constitute the sub-bundle 10 as described above, the number of welding works for the sub-bundles 10 may be relatively reduced when producing a membrane wall in a cylindrical duct shape having a predetermined diameter.

When the tubes 11 are formed of chrome steel, the tubes 11 constituting the sub-bundle 10 may be coupled to each other through the automatic welding based on a membrane panel welding manner.

According to the membrane panel welding manner, a membrane bar, that is, an iron plate is used to be filled in the gap between the tubes 11. The membrane bar may be mounted between the tubes 11 and both lateral sides of the membrane bar may be welded.

When the tubes 11 are formed of alloy steel, the tubes 11 constituting the sub-bundle 10 may be coupled to each other through the automatic welding based on a plasma welding manner.

Regarding the principle of the plasma welding manner, when gas is discharged to pass through a heat source, atoms of gas are decomposed into electrons and ions due to a high temperature, which is called "plasma (ultra-high-temperature gas)", and the plasma welding is to cool the discharged arc and concentrate the arc on the end portion of a tip using a water-cooled nozzle having a small caliber.

Argon gas passes through high-temperature arc to be changed into plasma, and the heat source thereof is generated together with a plasma stream having heat concentration higher than that of another welding manner, so that one strand of heat source is formed. Accordingly, the heat source represents a high penetration degree and a narrow welding width, so that the heat deformation of a preform may be less caused. Therefore, the preform can be stably welded without the distortion thereof.

Figure 6:
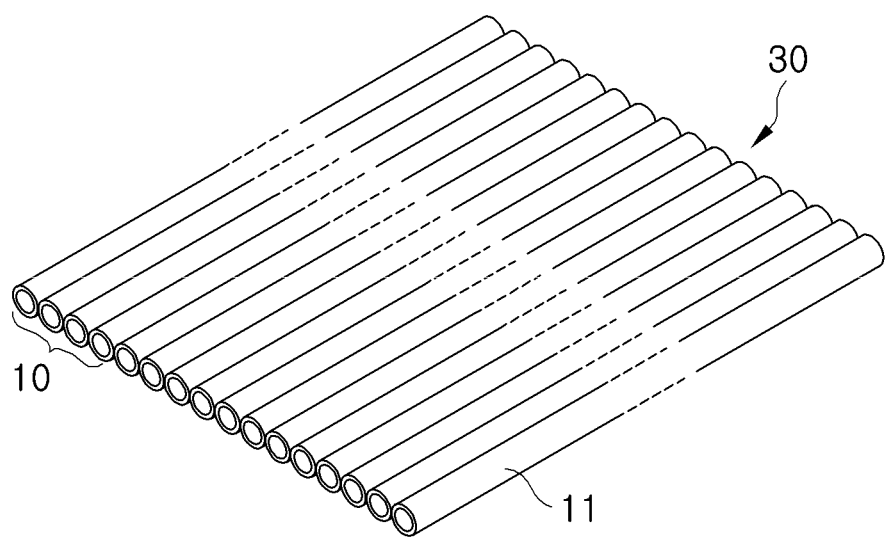
FIG. 6 is a view showing the state that a panel-type bundle constituting the cylindrical membrane wall according to one embodiment of the present invention is produced.

FIG. 6 is a view showing the state that a panel-type bundle constituting the cylindrical membrane wall according to one embodiment of the present invention is produced.

Referring to FIGS. 4 and 6, in step S30, sub-bundles 10 constituting a panel-type bundle 30 may be coupled to each other through automatic welding.

When the tubes 11 are formed of chrome steel, the sub-bundles 10 may be coupled to each other through the automatic welding based on a gantry panel welding manner.

According to the gantry panel welding manner, one gantry has at least two head types of structures, so that at least two welding lines can be simultaneously welded by one worker. Accordingly, the productivity improvement and the reduction of man power can be increased.

The panel-type bundle 30 is configured to have a flat panel shape by coupling at least two sub-bundles 10 to each other.

The cylindrical membrane wall may be produced to include two to four panel-type bundles 30.

When the tubes 11 are formed of alloy steel, the sub-bundles 10 may be coupled to each other through the automatic welding based on a Gas tungsten arc welding manner.

The Gas tungsten arc welding manner is a nonconsumable inert gas arc welding manner, so that coating agents and solvents are not required, and all postures of a worker is allowed for the welding work. Accordingly, high efficiency can be represented in the welding work and the excellent welding quality can be obtained.

Figure 7:
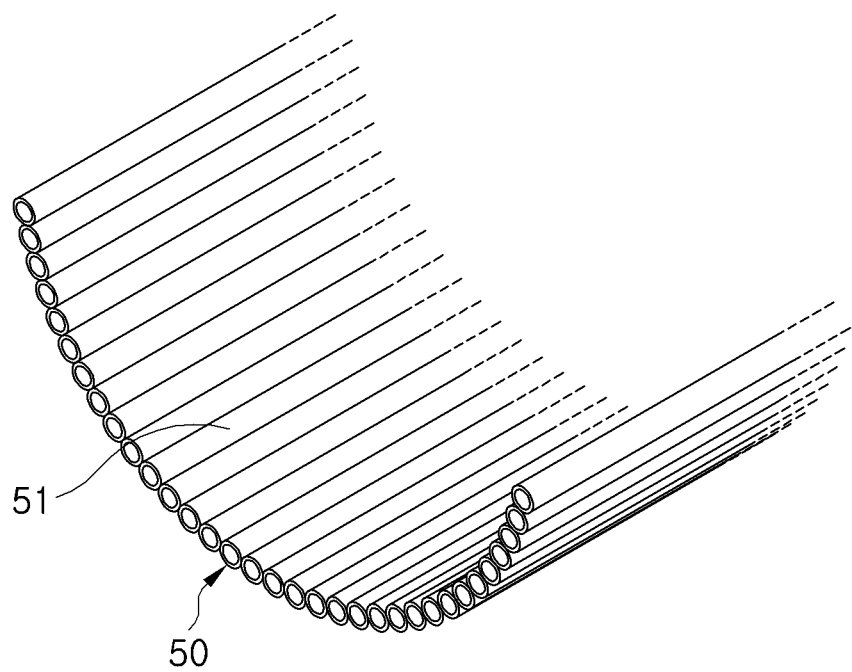
FIG. 7 is a view showing the curved state of a panel-type bundle constituting the cylindrical membrane wall according to one embodiment of the present invention.

Referring to FIGS. 4 and 7, in step S50, the panel-type bundle 30 is pressed by a press machine to form a curved bundle 50 having a curved surface 51 of a predetermined curvature.

The panel-type bundle 30 is pressed to be curved perpendicularly to the direction of the lengths of the tubes 11. In other words, the panel-type bundle 30 is curved so that each of the tubes 11 is maintained in an original state while each tube 11 is disposed on a predetermined circular arc.

Figure 8:
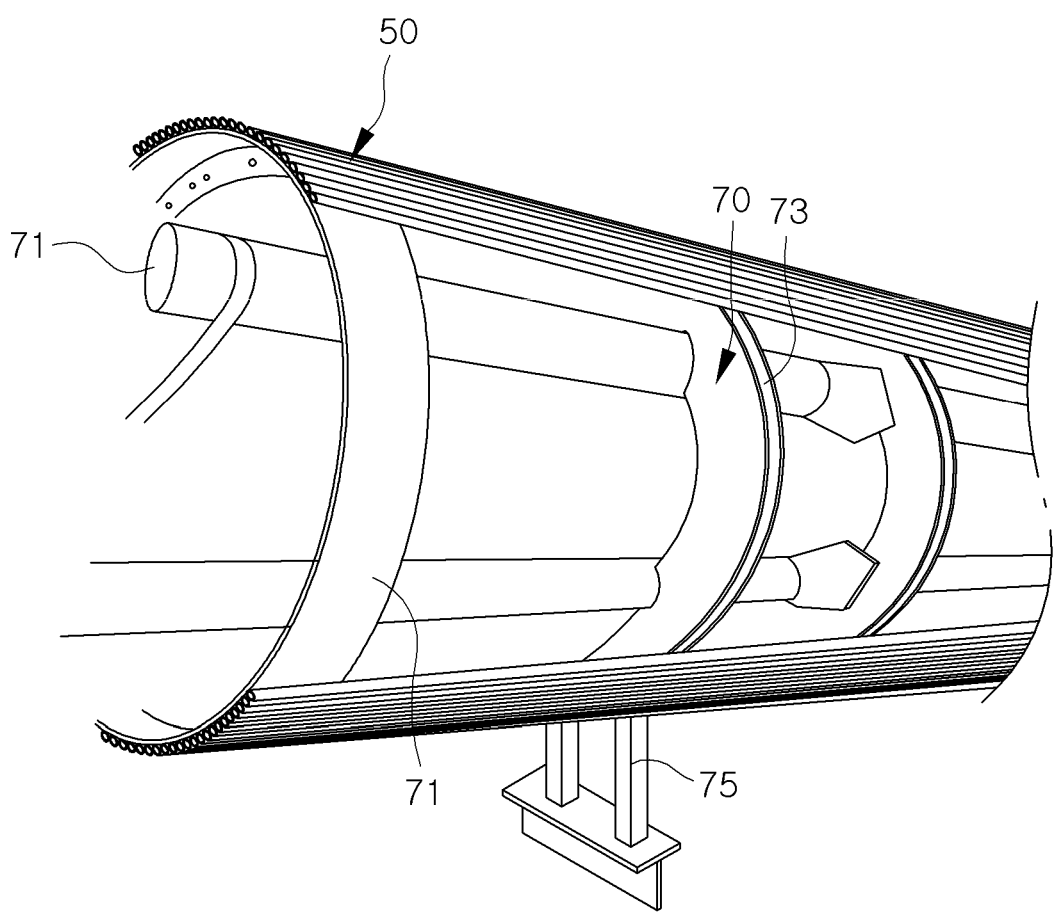
FIG. 8 is a view showing the state that the cylindrical membrane wall is produced by welding panel-type bundles to each other according to one embodiment of the present invention.

Referring to FIGS. 4 and 8, in step S70, curved bundles 50 are welded to each other through a cylindrical jig 70.

The cylindrical jig 70 includes a pillar 71 having a length substantially corresponding to those of the tubes 11 and cylindrical support members 73 surrounding the pillar 71, arranged at a predetermined interval in the direction of the lengths of the tubes 11, and making contact with a panel surface of the curved bundle 50.

The cylindrical jig 70 is spaced apart from the ground surface by a predetermined distance, and the panel surface of the curved bundle 50 is supported onto the circumference of the support member 73 in contact with the circumference of the support member 73 so that the curved bundles 50 are welded to each other. In this case, a support member 75 having one end portion supported onto the ground surface and an opposite end portion making contact with the curved bundle 50 may be additionally employed.

In the welding process and the pressing process of the press machine, welding characteristics and pressing intensities may be varied depending on the conditions of the tubes, for example the material and the diameter of the tube, and the diameter of the cylindrical membrane wall to be produced.

Hereinafter, a method for manufacturing a transfer duct using a curved part according to another embodiment of the present invention will be described.

Figure 9:
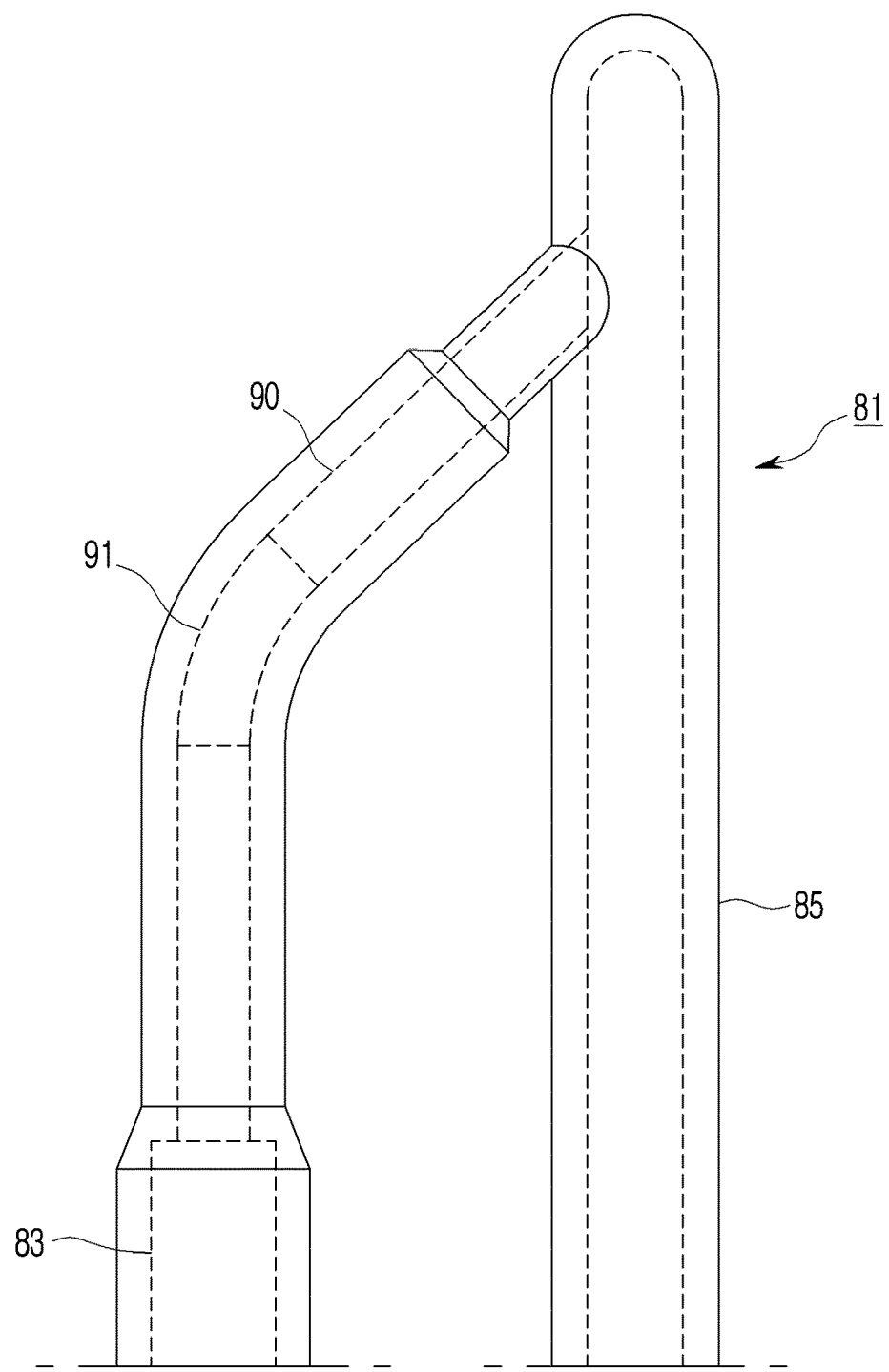
FIG. 9 is a view showing the structure of a gasification device in an IGCC power plant according to one embodiment of the present invention.

FIG. 9 is a view showing the structure of a gasification device in an integrated gasification combined cycle (IGCC) power plant according to one embodiment of the present invention.

Referring to FIG. 9, a gasification device 81 employing an IGCC technology includes a gasifier 83 that reacts a hydrocarbon feedstock with, for example oxygen, to change the hydrocarbon feedstock into a gas mixture (that is, syngas), and a cooler 85 that cools high-temperature syngas discharged from the gasifier 83 to generate high-pressure steam and middle-pressure steam.

The gasifier 83 and the cooler 85 are connected with each other through a transfer duct 90. The transfer duct 90 includes a cylindrical duct formed by longitudinally coupling a plurality of pipes to each other while forming a substantially cylindrical shape, and may include a curved part 91 having a predetermined curvature.

Figure 10:
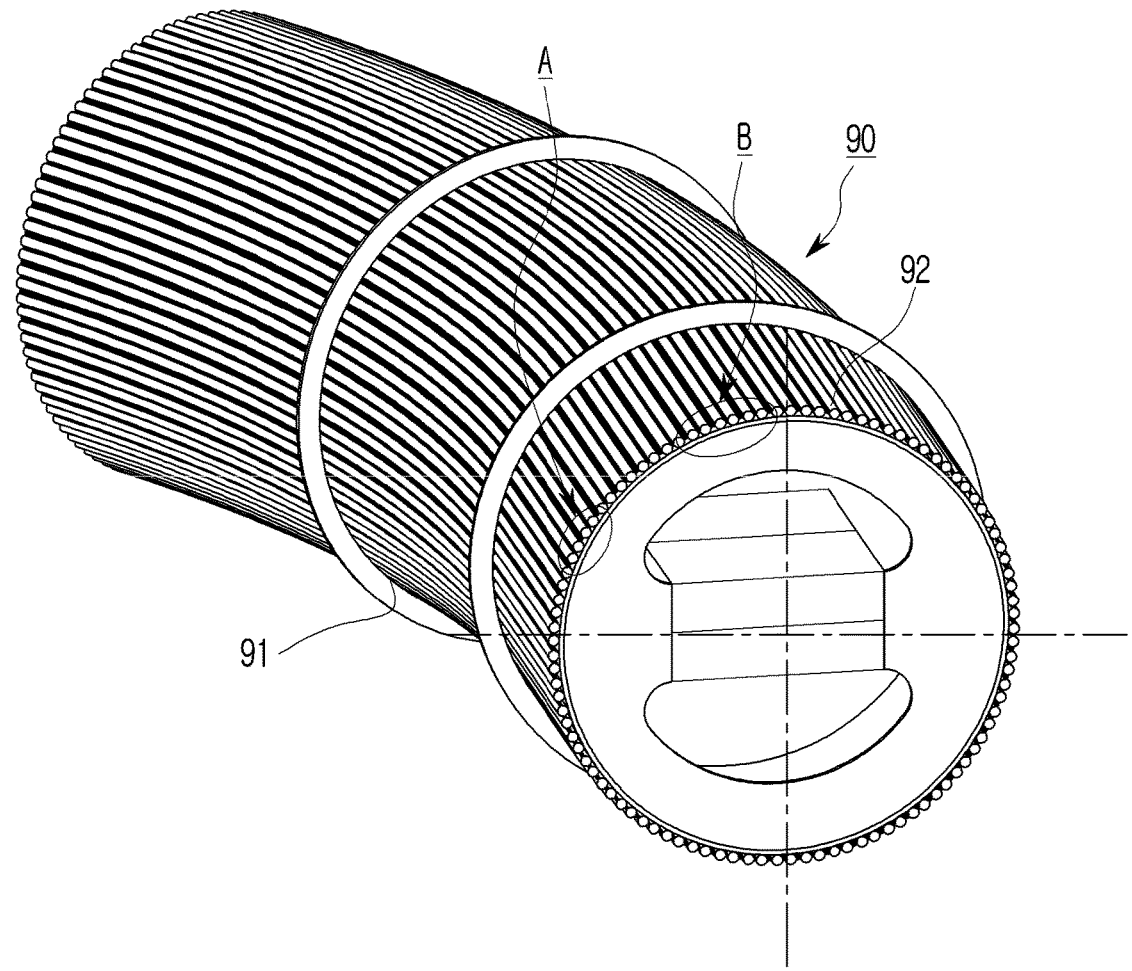
FIG. 10 is a perspective view showing the transfer duct of FIG. 9.

FIG. 10 is a perspective view showing the transfer duct of FIG. 9.

Referring to FIG. 10, the transfer duct 90 is produced in a cylindrical shape by longitudinally coupling a plurality of pipes 92 having inner parts, through which coolants flow, to each other. The transfer duct 90 is provided at a substantially central portion thereof with the curved part 91 having the predetermined curvature.

As the transfer duct 90 has the curved shape as described above, the pipes 92 of the transfer duct 90 have predetermined curvatures. In addition, the pipes 92 are required to have mutually different angles of twist at parts positioned in a circumferential direction of the transfer duct 90, for example parts A and B.

Figure 11:
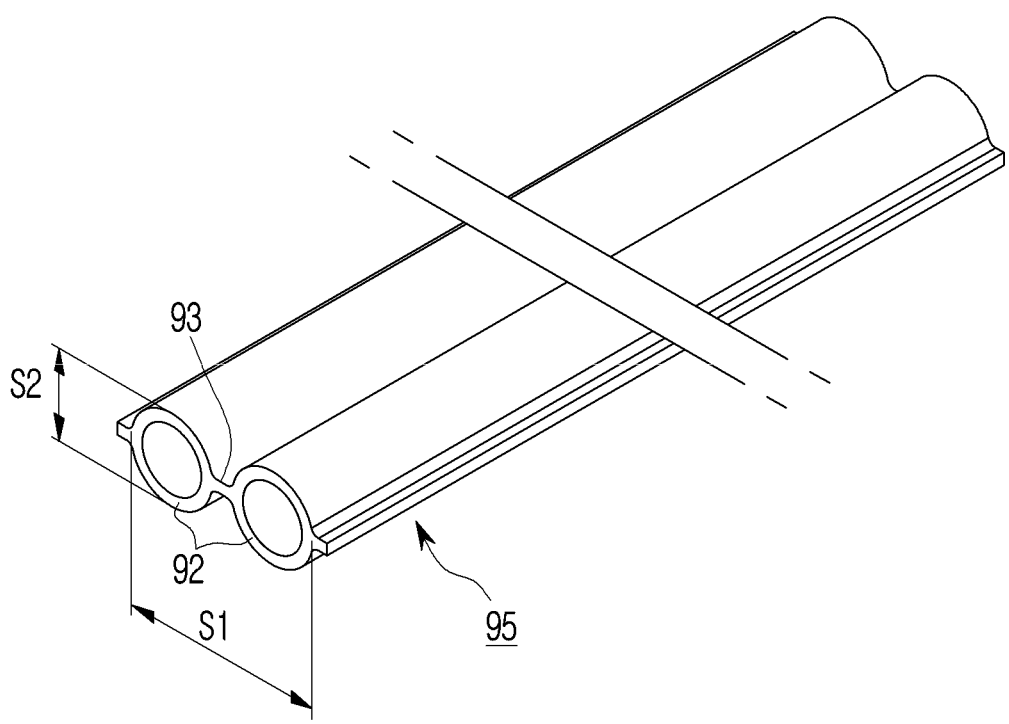
FIG. 11 is a perspective view showing the structure of a unit pipe assembly according to one embodiment of the present invention.
Figure 12:
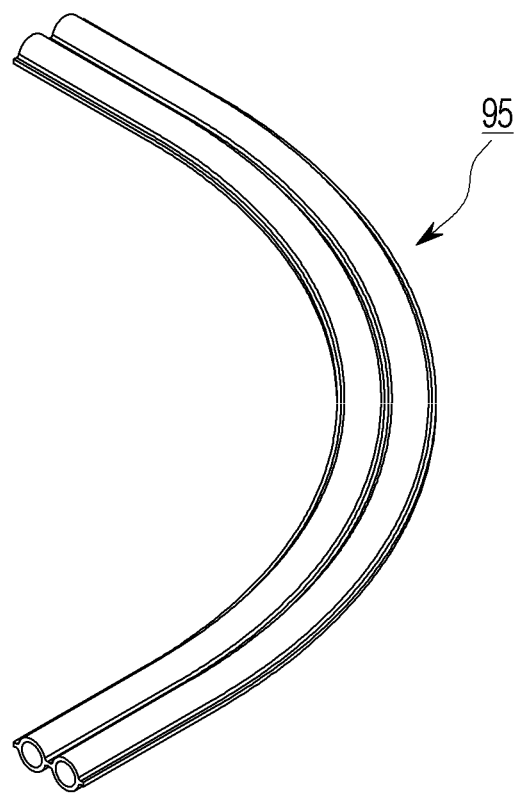
FIG. 12 is a perspective view showing the state that the unit pipe assembly according to one embodiment of the present invention is bent.

FIG. 11 is a perspective view showing the structure of a unit pipe assembly according to one embodiment of the present invention, and FIG. 12 is a perspective view showing the state that the unit pipe assembly according to one embodiment of the present invention is bent.

Referring to FIG. 11, the pipes 92 have pins 93 provided in longitudinal directions of the pipes 92 to reduce the number of works for the transfer duct, and the two pipes 92 may be coupled to each other through the pins 93 to provide the unit pipe assembly 95.

The two pipes 92 may be coupled to each other by performing the automatic welding, such as plasma welding, with respect to the gap between mutually adjacent pins 93.

The unit pipe assembly 95 assembled as described above is formed in a substantially rectangular shape including two longer sides S1 formed as cross-sectional contours of the pipes face each other, and two shorter sides S2 facing each other.

Referring to FIG. 12, the unit pipe assembly 95 is bent to have a predetermined curvature corresponding to that of the curved part 91 of the transfer duct 90, and machined to have a predetermined angle of twist.

The unit pipe assembly 95 is machined with various angles of twist depending on the position thereof in the circumferential direction of the transfer duct to be manufactured.

Figure 13:
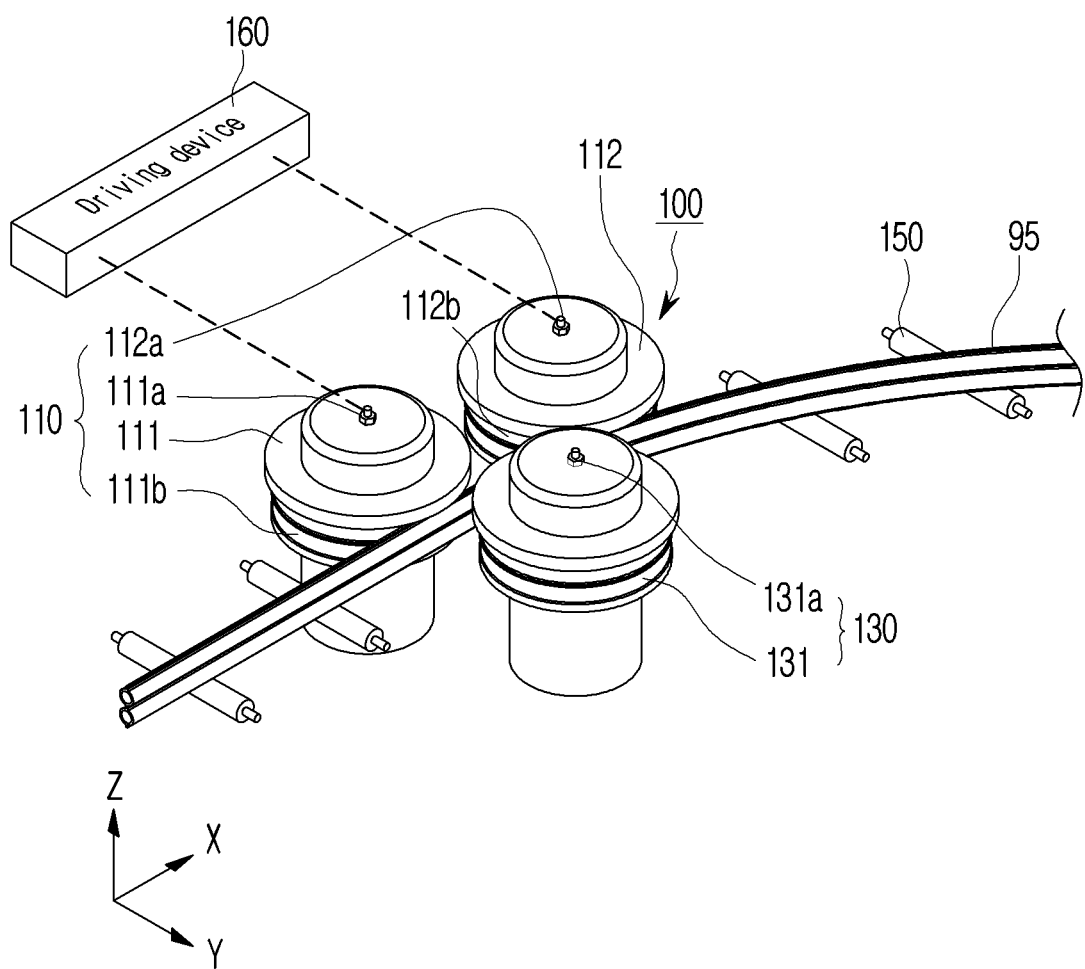
FIG. 13 is a perspective view showing a unit pipe assembly bending device according to one embodiment of the present invention.

FIG. 13 is a perspective view showing a unit pipe assembly bending device according to one embodiment of the present invention.

Hereinafter, a direction that the unit pipe assembly 95 is transferred is defined as an X axis, a direction perpendicular to the X axis is defined as a Y axis, and a direction perpendicular to an XY plane is defined as a Z axis.

Referring to FIG. 13, the bending device 100 may include a movable bending tool 110, a counter tool 130, a plurality of sliders 150 to slidably transfer the unit pipe assembly 95 in a longitudinal direction between the movable bending tool 110 and the counter tool 130, and a driving device 160 to move the movable bending tool 110.

The movable bending tool 110 may be configured in the structure of moving to a machining position allowing the unit pipe assembly 95 to be formed in a desirable bending shape from a non-machining position at which the unit pipe assembly 95 is not bent during the forward movement of the unit pipe assembly 95.

The movable bending tool 110 may include at least one of bending rollers 111 and 112 having movable axes 111a and 112a parallel to the Z axis and movable on the XY plane by the driving device 160. The movable axes 111a and 112a rotatably support the bending rollers 111 and 112 so that the unit pipe assembly 95 is movably supported lengthwise in contact with circumferential surfaces of the bending rollers 111 and 112.

The counter tool 130 may include at least one die roller 131 that faces the bending rollers 111 and 112 and is rotatably supported by a fixed axis 131a parallel to the Z axis.

The unit pipe assembly 95 may be bent with the curvature radius corresponding to that of the curved part 91 of the transfer duct 90 through the bending rollers 111 and 112 and the die roller 131 configured described above.

Figure 1:
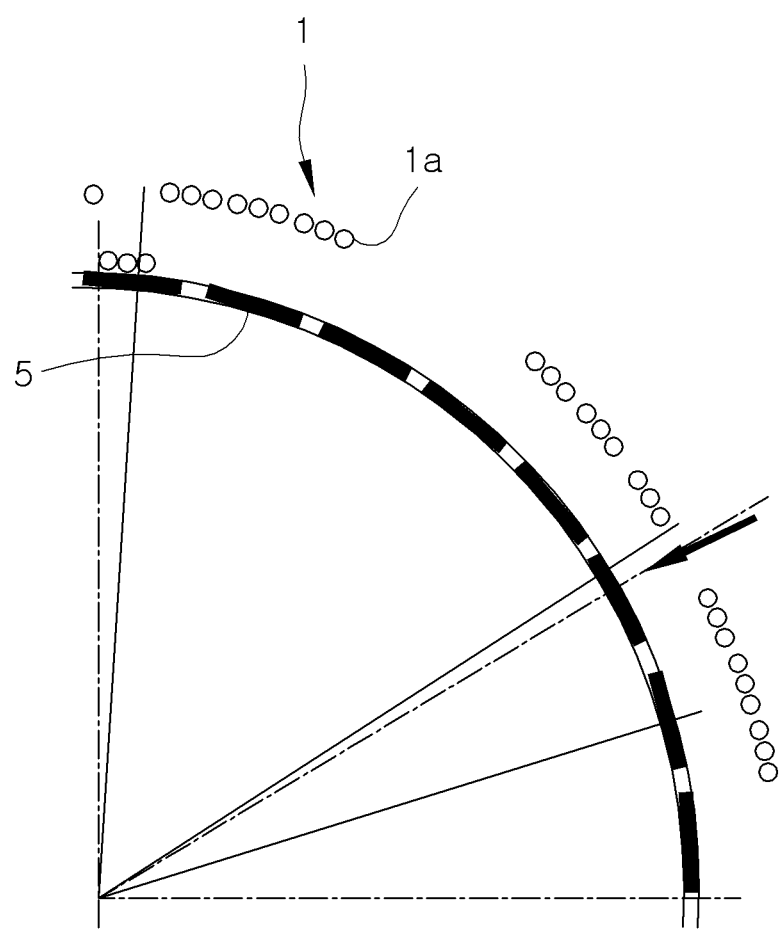
FIG. 1 is a view to explain the state that a cylindrical membrane wall according to the related art is produced.
Figure 2:
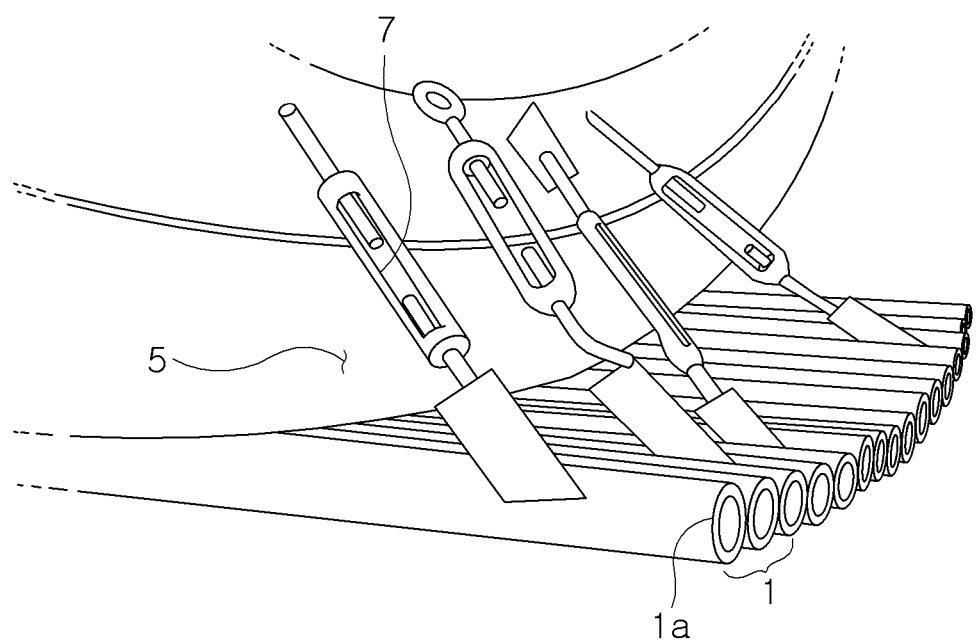
FIG. 2 is a view showing the state that a turn buckle is employed when producing the membrane wall according to the related art.
Figure 3:
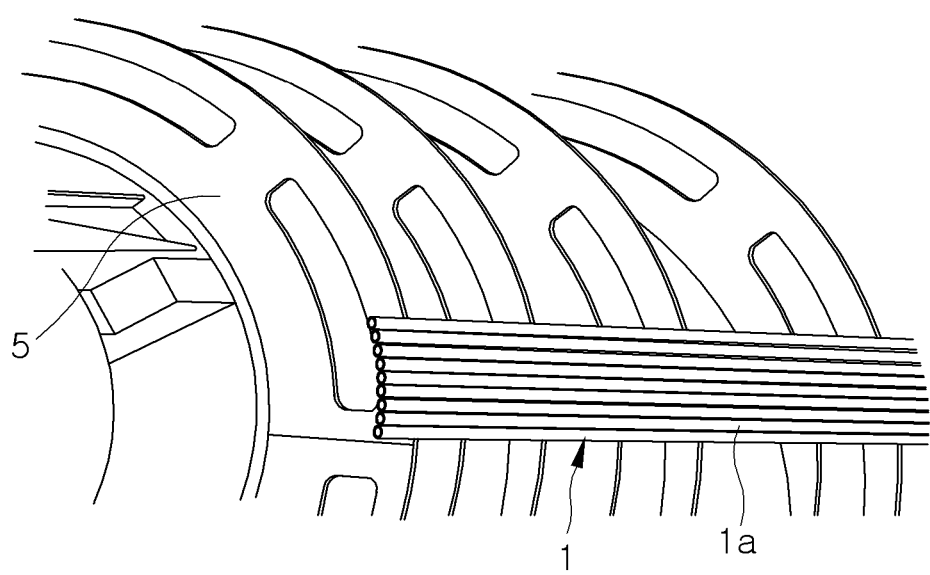
FIG. 3 is a view showing the state that a jig is employed when producing the membrane wall according to the related art.

The bending rollers 111 and 112 and the die roller 131 may be provided in circumferential surfaces thereof with grooves 111b and 112b having about two concave parts corresponding to the contour (the shape of the longer sides 31 shown in FIG. 3a) of the unit pipe assembly 95.

In addition, the circumferential surfaces of the bending rollers 111 and 112 may be inclined at a predetermined angle with respect to the movable axes 111a and 112a, and the circumferential surface of the die roller 131 may be inclined corresponding to the circumferential surfaces of the bending rollers 111 and 112.

Through the above configuration, the unit pipe assembly 95 is bent with a predetermined curvature and simultaneously twisted at a predetermined angle.

The inclination angles a° of the circumferential surfaces of the bending rollers 111 and 112 and the die roller 131 may be variously formed corresponding to an angle of twist required depending on the parts positioned in the circumferential direction of the transfer duct 10, and variably employed according to desirable machining conditions The present invention provides an advanced bending process capable of reducing the number of works and ensuring the precise dimension of a bending product as the unit pipe assembly 95 can obtain two types of bending shapes having the predetermined curvature and the twist through one work as described above.

Figure 14:
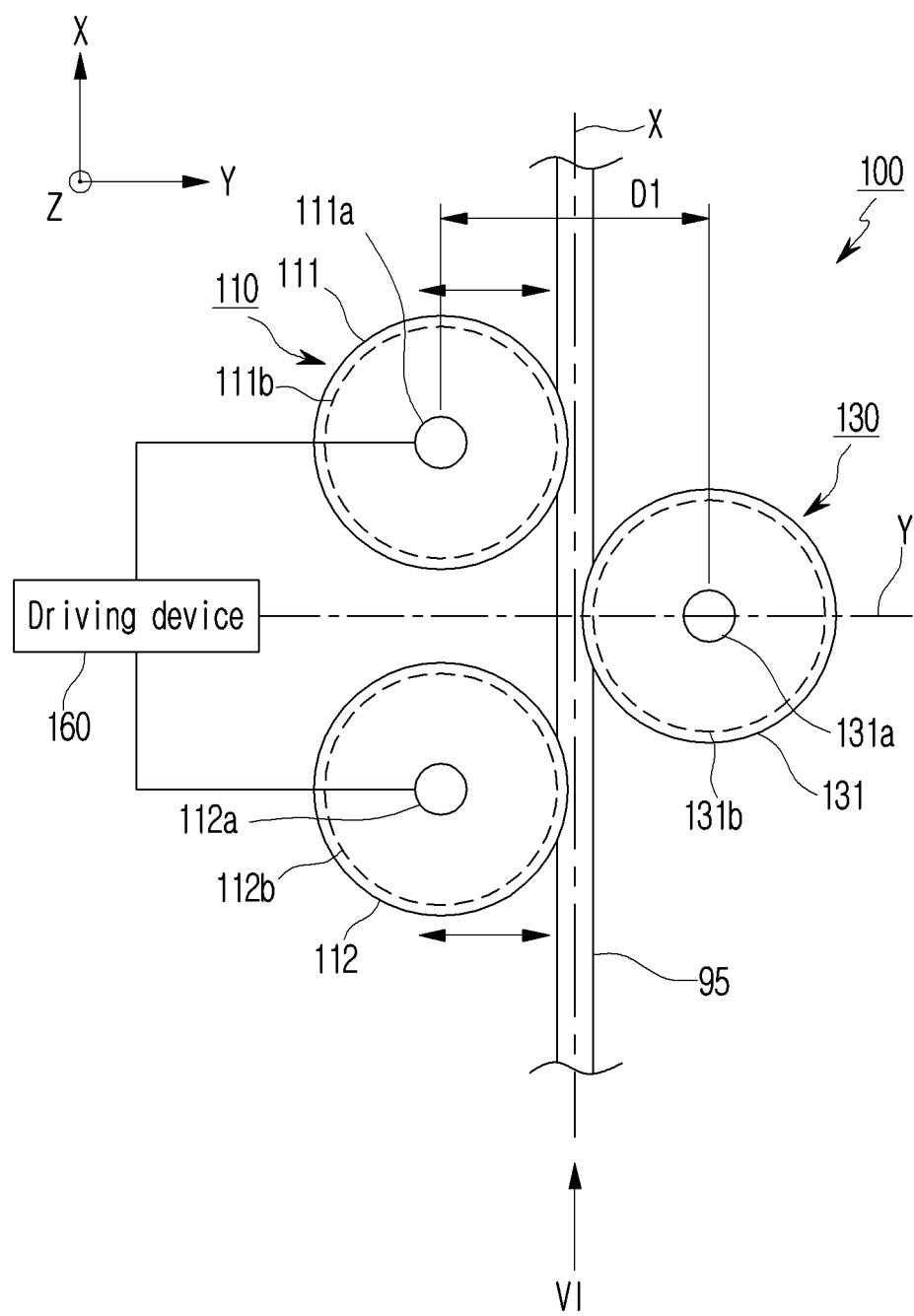
FIG. 14 is a plan view showing the structure of the unit pipe assembly bending device according to one embodiment of the present invention.
Figure 15:
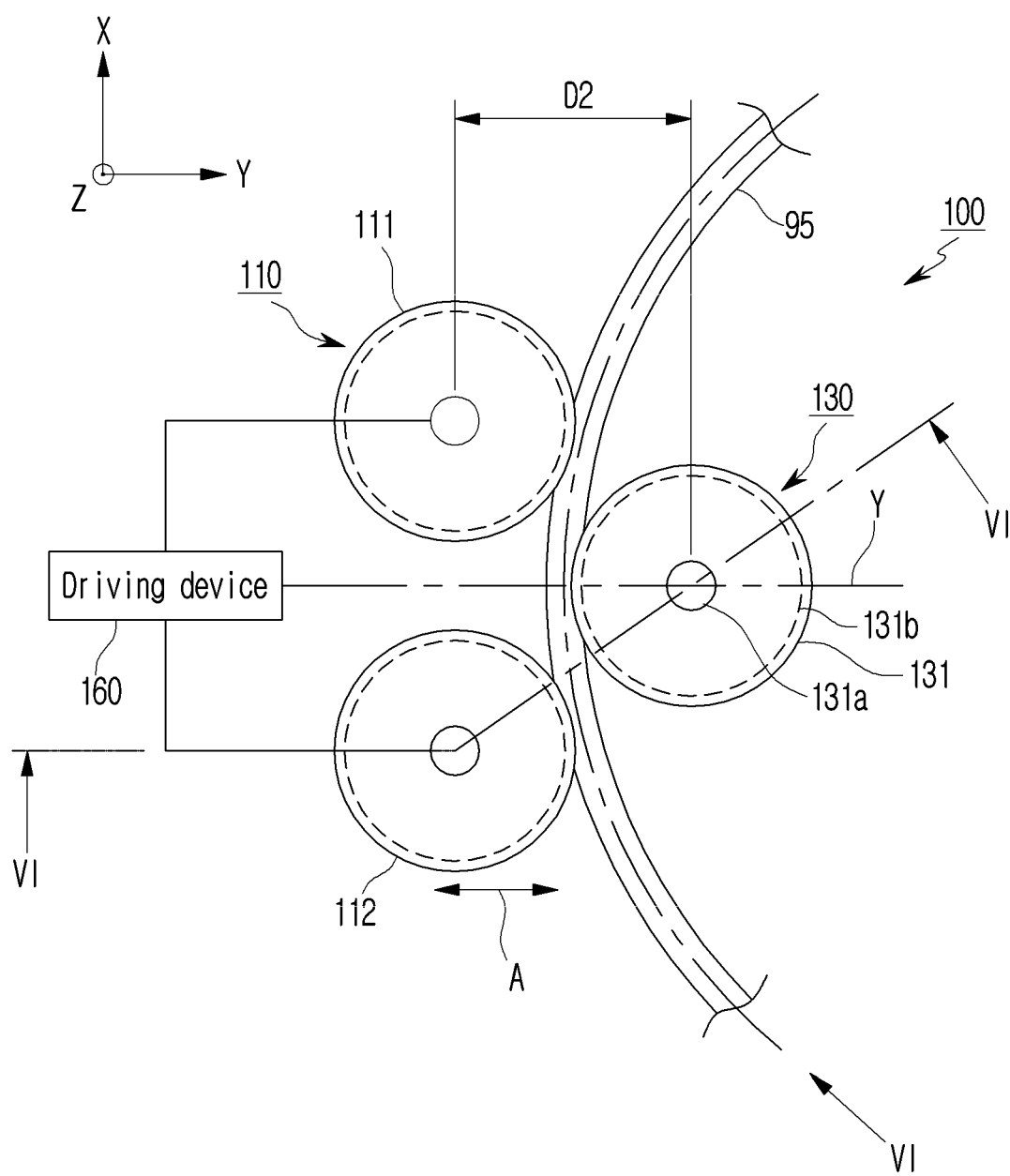
FIG. 15 is a view showing the operating state of the unit pipe assembly bending device according to one embodiment of the present invention.

FIG. 14 is a plan view showing the structure of the unit pipe assembly bending device according to one embodiment of the present invention, and FIG. 15 is a view showing the operating state of the unit pipe assembly bending device according to one embodiment of the present invention.

Referring to FIG. 14, the unit pipe assembly 95 serving as a slender member is propelled forward by a propelling device (not shown) so that the unit pipe assembly 95 is propelled into the space between the bending rollers 111 and 112 and the die roller 131. In this case, the bending rollers 111 and 112 are arranged at the non-machining position so that a predetermined distance D1 is formed between the centers of the bending rollers 111 and 112 and the center of the die roller 131 in the Y axial direction.

In this state, the unit pipe assembly 95 slides forward along the circumferential surfaces of the bending rollers 111 and 112 and the die roller 131 in contact with the circumferential surfaces of the bending rollers 111 and 112 and the die roller 131. In this case, the unit pipe assembly 95 is not deformed.

Referring to FIG. 15, if the unit pipe assembly 95 moves forwards by a predetermined distance, the driving device 160 is driven so that the bending rollers 111 and 112 linearly move along an arrow A on the XY plane.

Accordingly, the distance between the centers of the bending rollers 111 and 112 and the center of the die roller 131 becomes a distance D2. The distance D2 becomes shorter than the distance D1, and the unit pipe assembly 95 is bent with the predetermined curvature.

Figure 16:
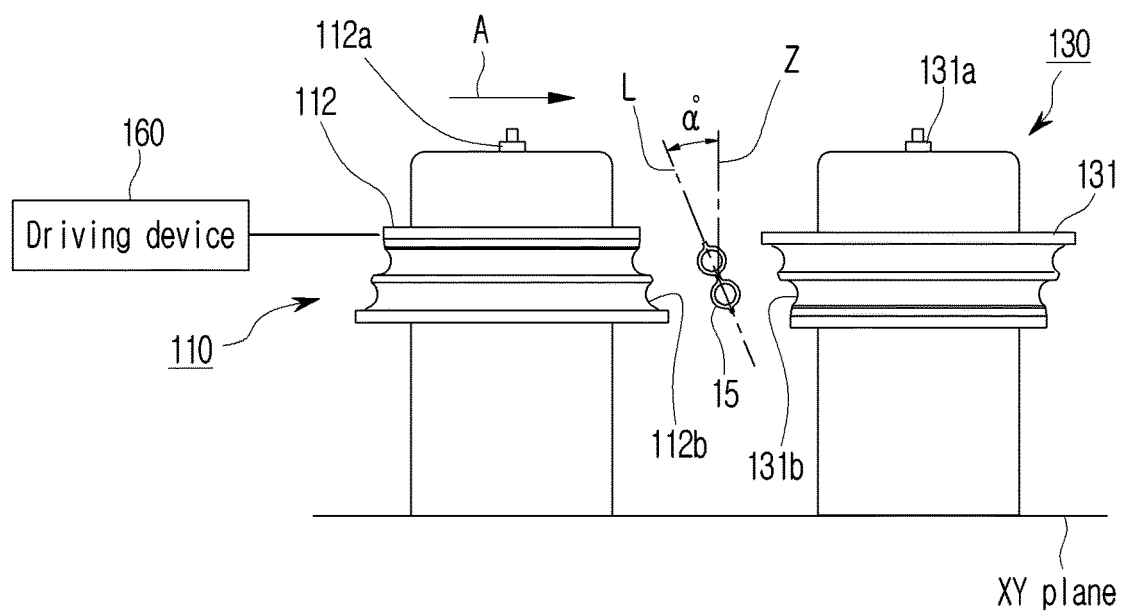
FIG. 16 is a sectional view taken along line XVI-XVI of FIG. 15.

FIG. 16 is a sectional view taken along line XVI-XVI of FIG. 15.

Referring to FIG. 16, the circumferential surface of the bending roller 111 is inclined so that the unit pipe assembly 95 is pressed and transferred in the state that a longer-side axis L of the unit pipe assembly 95 is inclined at a predetermined angle α° with respect to the Z axis perpendicular to the XY plane, the circumferential surface of the die roller 131 is inclined corresponding to the circumferential surface of the bending roller 111, and grooves 112b and 131b are formed in the inclined circumferential surfaces thereof.

The longer-side surface of the unit pipe assembly 95, that is, the outer contour of the unit pipe assembly 95 formed by arranging a pair of pipes in parallel is inclined in contact with the grooves 111a and 131a. In this state, the outer contour of the unit pipe assembly 95 is movably supported by the grooves 111a and 131a.

If the bending rollers 111 and 112 are moved in a direction of significantly approaching the die roller 131 (in the direction of the arrow A) when viewed on the XY plane in the above state, the unit pipe assembly 95 is bent with a predetermined curvature at an angle of twist.

Accordingly, the unit pipe assembly 95 is bent with the predetermined curvature and simultaneously twisted in the inclination state.

FIG. 16 shows that the bending roller 112 has the circumferential surface inclined upward to represent a trapezoidal sectional surface, and the die roller 113 have an inverted trapezoidal sectional surface corresponding to that of the bending roller 112.

The bending roller 112 and the die roller 113 may have an inverted trapezoidal sectional surface and a trapezoidal sectional surface, and the circumferential surfaces may have various inclination angles. Through the above structure, the bending can be performed by changing and employing the bending roller 112 and the die roller 113 according to the unit pipe assembly 95 having an angle of twist varying depending on the position thereof in the circumferential direction of the transfer duct 90.

Figure 17:
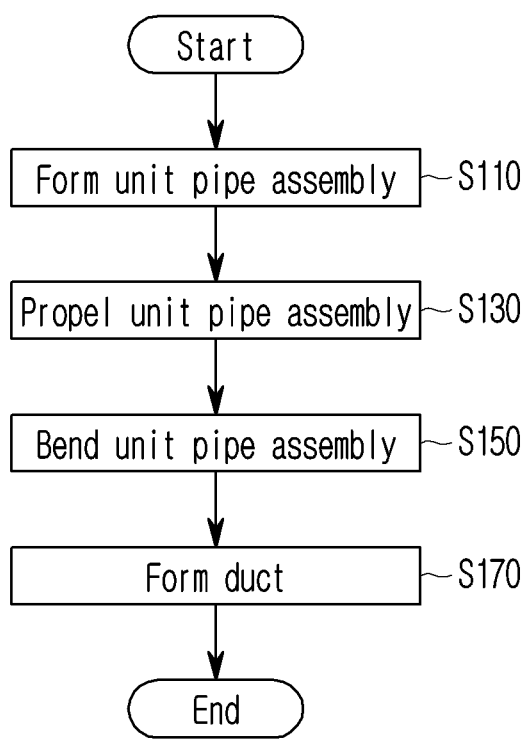
FIG. 17 is a flowchart showing the method for manufacturing the transfer duct according to one embodiment of the present invention.

FIG. 17 is a flowchart showing the method for manufacturing the transfer duct according to one embodiment of the present invention.

Referring to FIG. 17, the method for manufacturing the transfer duct includes forming a unit pipe assembly (S110), propelling the unit pipe assembly (S130), bending the unit pipe assembly (S150), and forming a cylindrical duct having a curved part by coupling unit pipe assembles to each other (S170).

Referring to FIGS. 11 and 17, the forming of the unit pipe assembly (S110) includes preparing two pipes (92) having pins 93 provided in a longitudinal direction of the pipes, and coupling the pins 93 to each other through automatic welding, for example a plasma welding manner after longitudinally arranging the pipes 92 in parallel to each other.

Referring to FIGS. 13 and 17, the propelling of the unit pipe assembly (S130) includes propelling the unit pipe assembly 95 into the space between the movable bending tool 100 and the counter tool 130 fixedly disposed in opposition to the movable bending tool 100 by a propeller (not shown). In this case, the unit pipe assembly 95 slides in contact with the slider 150 while moving forward in the longitudinal direction thereof.

Referring to FIGS. 14, 15, and 17, in the bending of the unit pipe assembly 95 (S150), the movable bending tool 110 is moved to a machining position (the state in FIG. 15) allowing the unit pipe assembly 95 to be formed in a desirable bending shape from a non-machining position (the state in FIG. 14) at which the unit pipe assembly 95 is not bent during the forward movement of the unit pipe assembly 95, so that the bending rollers 111 and 112 of the movable bending tool 110 bends the unit pipe assembly 95 with a desirable curvature radius.

In other words, the movable axes 111a and 112b of the bending rollers 111 and 112 are moved in the arrow A on the XY plane formed by the longitudinal axis (X) of the unit pipe assembly 95 and the Y axis perpendicular to the longitudinal axis (X). In this case, as the die roller 131 constituting the counter tool 130 is fixed to a predetermined position, the unit pipe assembly 95 slides on the circumferential surfaces of the bending rollers 111 and 112 and the die roller 131 to be bent with the predetermined curvature.

Referring to FIG. 16, the circumferential surfaces of the bending rollers 111 and 112 constituting the movable bending tool 110 and the circumferential surface of the die roller 131 constituting the counter tool 130 are inclined, and the grooves 111b, 112b, and 131b are formed in the inclined circumferential surfaces in the shape corresponding to that of the longer-side surface of the unit pipe assembly 95, respectively. Accordingly, the unit pipe assembly 95 is moved forward in the state that the longer-side axis L of the unit pipe assembly 95 is inclined at a predetermined angle $\alpha°$ with respect to the Z axis perpendicular to the XY plane while being pressed in the Y axial direction.

Accordingly, the unit pipe assembly 95 is bent with the predetermined curvature in the state that the longer-side axis of the cross sectional surface of the unit pipe assembly 95 is inclined at a predetermined angle with respect to the Z axis perpendicular to the XY plane formed by the X axis and the Y axis perpendicular to the X axis.

As described above, the unit pipe assembly 95 may be curved with the predetermined curvature and simultaneously machined to be in a tilting state, thereby reducing the number of works and precisely ensuring the dimension of the unit pipe assembly 95.

Referring to FIGS. 10 and 17, the forming of the cylindrical duct (S170) includes forming the cylindrical duct 90 having the curved part 91 by longitudinally coupling the unit pipe assemblies 95, which is bent with the predetermined curvature in the state that the longer-side axis L of the cross sectional surface of the unit pipe assembly 95 is inclined, to each other.

As shown in FIG. 10, the cylindrical duct 90 is completed by arranging the unit pipe assemblies 95 in the cylindrical shape while longitudinally arranging the unit pipe assemblies 95 adjacent to each other and by coupling the unit pipe assemblies 95 to each other. Accordingly, the angle of twist of the unit pipe assembly 95 is preferably changed and applied based on the position of the unit pipe assembly 95 constituting the cylindrical duct 90.

To this end, another bending roller and another die roller having a different inclination angle at the circumferential surfaces thereof may be variably applied.

Figure 18:
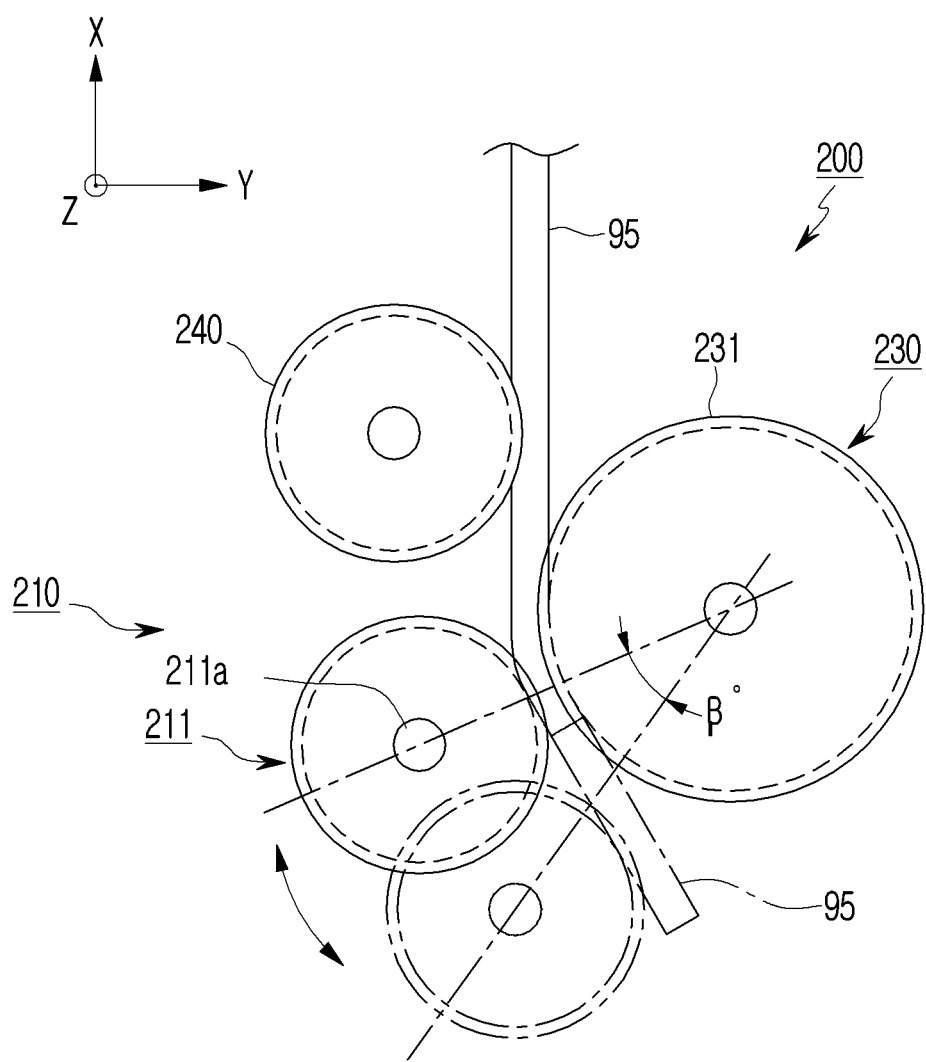
FIG. 18 is a plan view showing the structure of a unit pipe assembly bending device according to another embodiment of the present invention.

FIG. 18 is a plan view showing the structure of a unit pipe assembly bending device according to another embodiment of the present invention.

Referring to FIG. 18, a unit pipe assembly bending device 200 includes a movable bending tool 210 and a counter tool 230.

The movable bending tool 210 may include a bending roller 210 self-rotating in contact with the unit pipe assembly 95 and having a support axis 211a of the bending roller 210 rotatable at a predetermined angle $\beta°$ on the XY plane. The counter tool 230 may include a die roller 231 fixedly arranged in opposition to the bending roller 210 to support the unit pipe assembly 95 so that the outer circumferential surface of the unit pipe assembly 95 is slidable.

The unit pipe assembly bending device 200 may further include a contact roller 240 to support the unit pipe assembly 95 while pressing the unit pipe assembly 95 in an Y axis direction perpendicular to a longitudinal axis X thereof.

The bending roller 210, the die roller 230, and the contact roller 240 are configured to have inclined circumferential surfaces so that the unit pipe assembly 95 is bent with the predetermined curvature radius in a tilting state. Since the structures of the bending roller 210, the die roller 230, and the contact roller 240 are substantially identical to those shown in FIG. 16, the details thereof will be omitted.

As described above, the unit pipe assembly bending device according to the present invention may include all types of movable bending tools and counter tools allowing the unit pipe assembly to have a predetermined curvature and be bent in the tilting state.

Although the above description has been made regarding the device and the method for bending the unit pipe assembly for the illustrative purpose, the present invention is not limited thereto, but a slender member may be employed instead of the unit pipe assembly 95.

The slender member means all members extending lengthwise in an axial direction, and may include a single pipe. In addition, the slender member may include all members such as rods or bars.

Although the exemplary embodiments of the present invention have been described with reference to accompanying drawings, it is understood that the present invention should not be limited to these exemplary embodiments but various changes and modifications can be made by one ordinary skilled in the art within the spirit and scope of the present invention as hereinafter claimed.

The invention claimed is:

1. A method for manufacturing a transfer duct, the method comprising:
   forming a unit pipe assembly by coupling a pair of pipes to each other in a longitudinal direction through a pin;
   propelling the unit pipe assembly into a space between a movable bending tool and a counter tool;
   pressing the unit pipe assembly with a predetermined curvature by moving the movable bending tool to a predetermined position while bringing a surface of the unit pipe assembly into contact with inclination surfaces of the movable bending tool and the counter tool; and
   forming a cylindrical duct having a curved part by coupling unit pipe assembles, which are bent in the bending of the unit pipe assembly, to each other,
   wherein the pressing the unit pipe assembly with the predetermined curvature simultaneously bends the unit pipe assembly at a predetermined angle of twist according to an inclination angle of the inclination surfaces.

2. The method of claim 1, wherein each of the movable bending tool and the counter tool has an outer circumferential surface in which a plurality of grooves are formed in correspondence to an outer contour of the unit pipe assembly.

3. The method of claim 1, wherein the movable bending tools consist of various movable bending tools each having a bending inclination surface, and the counter tools consist of various counter tools each having a counter inclination surface, and wherein the bending inclination surfaces and the counter inclination surfaces have various inclination angles depending on the angle of the twist of the unit pipe assembly.

4. The method of claim 1, wherein the movable bending tool is supported by a movable axis, and wherein the inclination surface of the movable bending tool includes a bending inclination surface that is inclined with respect to the movable axis, and the inclination surface of the counter tool includes a counter inclination surface that corresponds to the bending inclination surface.

5. The method of claim 1, wherein the movable bending tool comprises at least one bending roller, which is rotatably supported by the movable axis and has an outer circumferential surface that is inclined upward or downward.

6. The method of claim 1, wherein the counter tool comprises at least one die roller, which is rotatably supported by a fixed axis fixedly disposed at the predetermined position and has an outer circumferential surface that is inclined with respect to the fixed axis and that corresponds to an outer circumferential surface of the moveable bending tool.

7. The method of claim 1, wherein the movable axis of the movable bending tool is movable to the predetermined position, and the unit pipe assembly is bent with the predetermined curvature and the predetermined angle of the twist by moving the movable bending tool to the predetermined position.

* * * * *